(12) United States Patent
Kagan et al.

(10) Patent No.: US 6,243,787 B1
(45) Date of Patent: Jun. 5, 2001

(54) SYNCHRONIZATION OF INTERRUPTS WITH DATA POCKETS

(75) Inventors: Michael Kagan, Zichron Yaakov; Diego Crupnicoff, Haifa; Freddy Gabbay; Shimon Rottenberg, both of Tel Aviv, all of (IL)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 09/559,352

(22) Filed: Apr. 27, 2000

(51) Int. Cl.$^7$ .................................................. G06F 9/46
(52) U.S. Cl. ..................................... 710/263; 710/129
(58) Field of Search .................................. 710/260, 263, 710/266, 126, 129; 370/426; 709/238, 250

(56) References Cited

U.S. PATENT DOCUMENTS

| | | | |
|---|---|---|---|
| 5,440,545 | * 8/1995 | Buchholz et al. | 370/426 |
| 5,659,758 | * 8/1997 | Gentry et al. | 710/263 |
| 5,689,713 | * 11/1997 | Normoyle et al. | 710/266 |
| 6,038,629 | * 3/2000 | Ogilvie et al. | 710/128 |

* cited by examiner

*Primary Examiner*—Glenn A. Auve
(74) *Attorney, Agent, or Firm*—McDonnell Boehnen Hulbert & Berghoff

(57) ABSTRACT

A method and apparatus for conveying data over a packet-switching network. Data are received from a peripheral device for transmission via the network to a memory associated with a central processing unit (CPU), followed by an interrupt signal from the peripheral device associated with the data. One or more data packets containing the data are sent over the network to a host network interface serving the memory and the CPU, followed by an interrupt packet sent over the network to the host network interface. Responsive to the interrupt packet, an interrupt input of the CPU is asserted only after the one or more data packets have arrived at the host network interface.

14 Claims, 2 Drawing Sheets

SYNCHRONIZATION OF INTERRUPTS WITH DATA POCKETS

FIELD OF THE INVENTION

The present invention relates generally to computing systems, and specifically to systems that use packet-switching fabrics to connect a computer host to peripheral devices.

BACKGROUND OF THE INVENTION

In current-generation computers, the central processing unit (CPU) is connected to the system memory and to peripheral devices by a parallel bus, such as the ubiquitous Peripheral Component Interface (PCI) bus. As data path-widths grow, and clock speeds become faster, however, the parallel bus is becoming too costly and complex to keep up with system demands. In response, the computer industry is moving toward fast, packetized, serial input/output (I/O) bus architectures, in which computing hosts and peripheral are linked by a switching network, commonly referred to as a switching fabric. A number of architectures of this type have been proposed, including "Next Generation I/O" (NGIO) and "Future I/O" (FIO), culminating in the "INFINI-BAND™" architecture, which has been advanced by a consortium led by a group of industry leaders (including Intel, Sun, Hewlett Packard, IBM, Compaq, Dell and Microsoft). Storage Area Networks (SAN) provide a similar, packetized, serial approach to high-speed storage access, which can also be implemented using an INFINIBAND fabric.

In a parallel bus-based computer system, when a peripheral device needs to deliver data to the CPU, it typically writes the data to the memory over the bus, using direct memory access. When the peripheral has finished writing, it asserts an interrupt to the CPU on one of the interrupt lines of the bus. Bus arbitration ensures that the CPU will not attempt to read the data from the memory until the writing of the data is complete. On the other hand, when the peripheral device and the CPU are connected by a packet-switching fabric, such as an INFINIBAND fabric, they operate asynchronously. Furthermore, the data sent to the memory and the interrupt to the CPU travel over different paths, or channels. Typically, a separate line or channel is provided to connect the interrupt pin of the peripheral device to an interrupt controller of the CPU, bypassing the switching fabric. Therefore, there is no a priori assurance that all of the data will have been written to the memory before the CPU begins reading.

The "race" between the interrupt path and the data path can result in errors (as when a CPU read stalls the data). Care must therefore be taken to synchronize data and interrupt handling and to make sure that the data have been completely written to the memory before the CPU attempts to read it.

A common solution in this situation is to program the CPU to access the peripheral device before accessing the memory, typically by performing a "configuration read" from the peripheral device. In this mode of operation, after the peripheral device has asserted the interrupt to the CPU (indicating that the last item of data has been sent to the memory), the CPU issues a read request through the switching fabric, to read an interrupt cause register in the peripheral device. The peripheral device responds to the read request by sending a packet containing the interrupt cause to the CPU over the same channel as it used to send the data to the memory. Since packets are ordered within a channel, the response to configuration read arrives at the CPU after all of the previous writes have been flushed to memory. The CPU begins to read the data from the memory only after it has received the interrupt cause packet back from the peripheral device. The configuration read thus serves two crucial purposes: it provides the CPU with the cause information that it needs in order to serve the interrupt, and it ensures that the CPU reads the memory only after all of the data have been written there.

This scheme has a number of serious performance drawbacks, however. Every interrupt sent by the peripheral device necessitates an additional exchange of messages through the switching fabric between the CPU and peripheral device. The exchange adds substantial latency—typically 10 microseconds or more—every time the CPU must service an interrupt. Furthermore, since configuration reads are used as synchronization barriers, the CPU is stalled from the moment the configuration read request is issued until its response has arrived. Valuable CPU time is therefore wasted waiting for the interrupt cause to be retrieved.

U.S. Pat. No. 5,689,713, whose disclosure is incorporated herein by reference, describes a method for interrupt request handling in a packet-switched computer system. The system may include a number of interrupt sources, which direct interrupts to any of a number of interrupt handlers. A system controller acts as an intermediary between interrupting devices and "interruptees." It includes an interrupt queue coupled to each interrupt source for receiving multiple interrupt requests, and an output queue coupled to each interrupt handler. The controller thus enables asynchronous data from multiple sources to be conveyed across a packet-switched interconnection, while providing a dedicated channel for interrupts associated with the data packets.

SUMMARY OF THE INVENTION

It is an object of the present invention to provide an improved method and system for passing data packets and associated interrupts through a switching fabric.

It is a further object of some aspects of the present invention to provide a method and system for communication between a CPU and peripheral devices via a switching fabric that ensures proper synchronization between data and interrupts transmitted over the fabric.

It is still a further object of some aspects of the present invention to provide a method and system for communication between a CPU and peripheral devices via a switching fabric that reduces latency and processing time required for servicing of interrupts by the CPU.

In preferred embodiments of the present invention, a CPU and a peripheral device are linked to a packet-switching fabric by respective host and target network interfaces. The target interface receives data over a local bus from the peripheral device, for transmission in the form of packets to a system memory associated with the CPU. After sending the data, the peripheral device asserts an interrupt. The interrupt from the device is connected to an interrupt input of the target interface, rather than directly to the CPU or to a central system controller, as in systems known in the art. In response to the interrupt, the target interface reads the interrupt cause from the peripheral device, and then sends a special interrupt packet, including the interrupt cause, to the host interface. Preferably, the target interface sends the interrupt packet on the same channel as it sent the data packets, i.e., over the same "virtual lane," or route, and with the same priority as the data packets. It thus assures that the host interface will receive the interrupt packet only after it has received all of the preceding data packets.

Upon receiving the interrupt packet, the host interface places the interrupt cause in a predefined register in the memory. An interrupt signal is then sent from the host interface to an interrupt input of the CPU. Upon receiving the signal, the CPU checks to ensure that the host interface has finished writing all of the data from the peripheral device to the memory. This check serves a similar purpose to the configuration read described in the Background of the Invention. Only after completing the check does the CPU read the interrupt cause and begin processing the data in the memory. The CPU performs all of these steps locally, communicating with the host interface and memory over a local system bus, with latency on the order of nanoseconds, rather than having to exchange messages with the peripheral device through the switching fabric, taking many microseconds. As a result, interrupt response latency is minimized, and the CPU does not waste precious time and resources waiting for the configuration read response.

In preferred embodiments of the present invention, the switching fabric comprises an INFINIBAND network, and the host and target interfaces respectively comprise host and target channel adapters. It will be appreciated, however, that the principles of the present invention may similarly be applied to transmission of interrupts through substantially any packet-switched network.

There is therefore provided, in accordance with a preferred embodiment of the present invention, a method for conveying data over a packet-switching network, including:

receiving data from a peripheral device for transmission via the network to a memory associated with a central processing unit (CPU);

receiving an interrupt signal from the peripheral device associated with the data;

sending one or more data packets containing the data over the network to a host network interface serving the memory and the CPU; and sending an interrupt packet over the network to the host network interface, responsive to which an interrupt input of the CPU is asserted only after the one or more data packets have arrived at the host network interface.

Typically, receiving the data includes receiving parallel data over a local bus from the peripheral device. Additionally or alternatively, receiving the data includes receiving data to be written to the memory by direct memory access.

Preferably, sending the interrupt packet includes reading a cause of the interrupt from the peripheral device, and incorporating the cause in the interrupt packet. Further preferably, the method includes receiving the interrupt packet at the host network interface, and writing the cause to a predetermined address in the memory, to be read by the CPU after the interrupt input is asserted.

In a preferred embodiment, sending the interrupt packet includes sending the interrupt packet after receiving an acknowledgment from the memory that the data have been written thereto.

Preferably, sending the one or more data packets includes sending the data packets over a selected channel through the network, and sending the interrupt packet includes sending the interrupt packet over the selected channel following the data packets.

Further preferably, the method includes:

receiving the data packets and the interrupt packet at the host network interface;

conveying the data in the packets for delivery to the memory over a local bus coupling the host network interface to the memory and the CPU; and notifying the CPU when all of the data have been conveyed.

Most preferably, conveying the data in the packets includes passing the data to a system controller on the bus, and notifying the CPU includes informing the CPU when an acknowledgment is received by the host network interface from the system controller, typically by asserting the interrupt input of the CPU after the acknowledgment from the system controller has been received. Additionally or alternatively, notifying the CPU includes asserting the interrupt input of the CPU responsive to receiving the interrupt packet at the host network interface.

There is also provided, in accordance with a preferred embodiment of the present invention, network interface apparatus, including:

a target channel adapter, which is operative to receive data from a peripheral device for transmission via a packet-switching network to a memory associated with a central processing unit (CPU) and to send one or more data packets containing the data over the network to a host network interface serving the memory and the CPU; and a target interface processor, adapted to receive an interrupt signal from the peripheral device associated with the data, and to send an interrupt packet over the network to the host network interface, responsive to which an interrupt input of the CPU is asserted only after the one or more data packets have arrived at the host network interface.

There is further provided, in accordance with a preferred embodiment of the present invention, network interface apparatus, including:

a host channel adapter, which is operative to receive data packets transmitted over a packet-switching network from a peripheral device, and to convey data from the packets for delivery to a memory associated with a CPU over a local bus that is coupled to the memory and the CPU, and further to receive an interrupt packet sent over the network responsive to an interrupt signal asserted by the peripheral device after sending the data to the network; and a host interface processor, adapted, responsive to the interrupt packet, to notify the CPU when all of the data have been conveyed to the local bus.

Preferably, the target and host channel adapters include INFINIBAND adapters.

The present invention will be more fully understood from the following detailed description of the preferred embodiments thereof, taken together with the drawings in which:

DETAILED DESCRIPTION OF PREFERRED EMBODIMENTS

Figure 1:
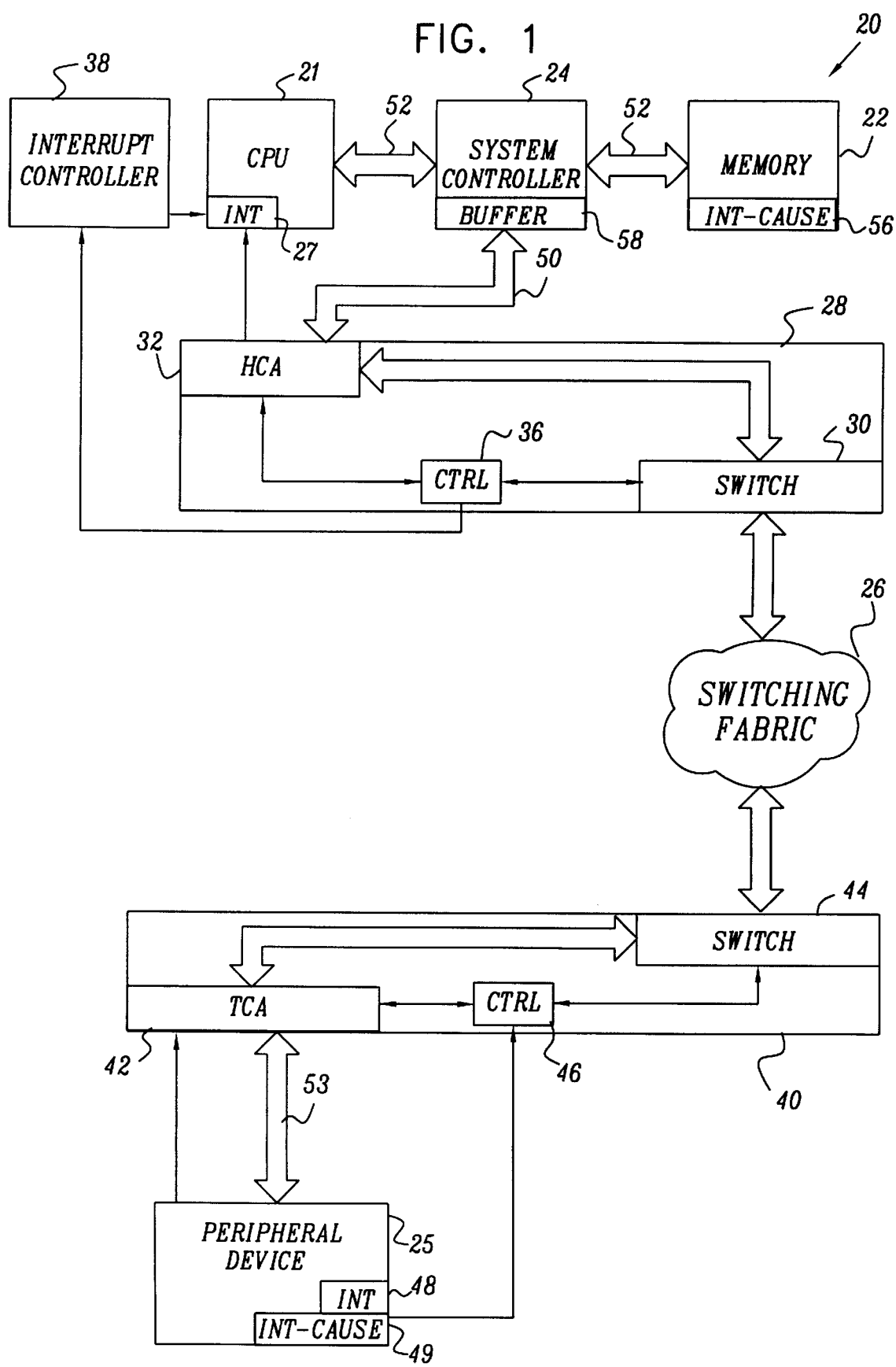
FIG. 1 is a block diagram that schematically illustrates a computing system based on a packet-switching fabric, in accordance with a preferred embodiment of the present invention.

FIG. 1 is a block diagram that schematically illustrates a computing system 20 built around a switching fabric 26, in accordance with a preferred embodiment of the present invention. The switching fabric preferably comprises an INFINIBAND fabric, as described in the Background of the Invention, and some of the terms used hereinbelow are specific to the INFINIBAND architecture. It will be understood, however, that the system architecture and methods of communication described herein are in no way limited to INFINIBAND, and that other switching fabrics, as are known in the art, may be configured to handle and convey interrupts in a similar manner.

A CPU 21 is coupled to communicate via a system bus 52 with a system controller 24 and a system memory 22, as is known in the art. Typically (although not necessarily), the CPU comprises an Intel Pentium processor, and bus 52 is a proprietary bus used in conjunction with this processor. System controller 24 is coupled to a standard I/O bus 50, such as a PCI bus, for the purpose of communicating with peripheral devices, such as I/O adapters of various types. One such peripheral device 25 is shown in FIG. 1 by way of example, but in practical applications, system 20 typically comprises multiple peripheral devices and, possibly, multiple CPUs. Peripheral device 25 includes an interrupt output 48, which it asserts in order to gain the attention of the CPU. In systems known in the art, interrupt output 48 is connected directly to an interrupt controller 38, such as an Intel 8259 device, which actuates an appropriate interrupt input 27 of CPU 21 when the interrupt is asserted. In system 20, however, interrupt output 48 and input 27 are linked only through fabric 26, as described hereinbelow.

Bus 50 is coupled to fabric 26 by a host network interface unit 28. This unit comprises a host channel adapter (HCA) 32, which interfaces with bus 50 and converts data between packet and parallel forms. Alternatively, the HCA may be designed to interface with system bus 52. A switch 30 links the HCA to one or more core switches in the fabric. Ordinarily, data in packets received by switch 30 from fabric 26 are passed through HCA 32 to bus 50. An exception is made, however, for management packets, which are packets that carry a special header identifying themselves as such and including a local identifier (LID) address of either switch 30 or HCA 32. These packets contain control instructions for the switch or HCA. They are placed in a dedicated register of the switch or HCA, as appropriate, which then attempts to decode the instructions and carry them out. Typically, the processing capabilities of the switch and HCA are very limited, and they are assisted by a fabric service agent (FSA), as described below, in dealing with at least some of these management packets.

A host interface unit controller 36 acts as the FSA in interface unit 28. The controller preferably comprises a microprocessor with random access memory (RAM) for software code and data, communicates with HCA 32 and switch 30. Alternatively, the controller may comprise a hard-wired hardware element or digital signal processor. When HCA 32 or switch 30 receives a management packet that it cannot decode, it passes the packet to the controller. The controller decodes the packet, preferably based on suitable software stored in its code RAM. It then takes whatever action is called for by the packet, such as giving appropriate instructions to HCA 32 or switch 30. When the HCA receives an interrupt packet, as described below, the actions taken by controller 36 also include signaling interrupt controller 38 via an interrupt output of unit 28, so as to actuate interrupt input 27 of CPU 21.

Although for simplicity, only a single interrupt line from unit 28 to controller 38 is shown in FIG. 1, the unit preferably comprises multiple interrupt lines. These lines can be actuated selectively by controller 36 so as to send multiple, different interrupts to CPU 21 depending on the content of interrupt packets received by the HCA. Alternatively or additionally, the different interrupt lines may be used to signal other host devices that are linked to bus 50.

Peripheral device 25 is coupled to fabric 26 by a target network interface unit 40, similar in structure to unit 28. A target channel adapter (TCA) 42 in unit 40 interfaces via an I/O bus 53 with device 25. Typically, although not necessarily, bus 53 comprises a PCI bus, like bus 50. A switch 44 links the TCA to the switching fabric. A target unit controller 46, similar to controller 36, acts as FSA to TCA 42 and switch 44 and also has a suitable input to receive signals from interrupt output 48 of device 25.

Figure 2:
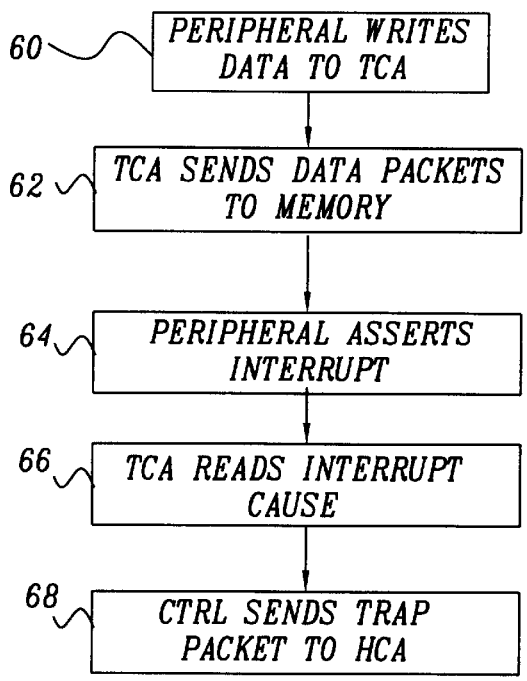
FIG. 2 is a flow chart that schematically illustrates a method for transmitting data from a peripheral device to a CPU in the system of FIG. 1, in accordance with a preferred embodiment of the present invention.

FIG. 2 is a flow chart that schematically illustrates a method by which target interface unit 40 processes and transmits data from peripheral device 25 to HCA 32 over fabric 26, in accordance with a preferred embodiment of the present invention. At a data writing step 60, device 25 writes data via bus 53 to TCA 42, to be conveyed by direct memory access to memory 22. The peripheral device assigns a priority to the data to be transmitted and informs the TCA of this priority. At a data sending step 62, the TCA packetizes the data and sends it over fabric 26 to the address of HCA 32, with the priority assigned by the peripheral device. A packet header instructs the HCA to write the data to memory 22. Preferably, the TCA negotiates with switch 44 and fabric 26 to assign a fixed route for all of the packets through the fabric. Such a route, together with the priority of the packets, is referred to herein as a channel. INFINIBAND specifies that packets travelling over the same channel are always kept in their original order.

When device 25 has finished posting to TCA 42 all of the data that it has to send, it asserts interrupt output 48, at an interrupt assertion step 64. At the same time, the peripheral device places the cause for the interrupt (in this case, to instruct CPU 21 to read the data from memory 22) in an interrupt cause register 49. In systems known in the art, when the CPU receives the interrupt, it must communicate with the peripheral device in order to read this register. In system 20, however, the interrupt signal is received by controller 46, which instructs TCA 42 to read the interrupt cause from register 49, at a cause reading step 66.

Based on the interrupt cause information read by the TCA, controller 46 constructs an interrupt packet containing the interrupt cause information, at an interrupt packet sending step 68. The interrupt packet is a management packet addressed to the LID of HCA 32. It is preferably sent by controller 46 over the same channel, or virtual lane, as the data packets, after the last of the data packets has been sent. The interrupt packet also identifies the data with which the interrupt is associated. As a result, when the interrupt packet arrives at its destination, controller 36 will be able to generate an interrupt to CPU 21 that is associated with the appropriate memory write, as described below. Controller 46 assures than interrupt packet is sent to the fabric after all of the data packets have already been accepted for sending. It thus ensures that HCA 32 will receive the interrupt packet only after it has received all of the data packets.

As an alternative, controller 46 may delay sending the interrupt packet until TCA 42 receives an acknowledgment from memory 22 that it has received all of the data. This approach introduces additional delay before CPU 21 can receive and act upon the interrupt, but it obviates the need to ensure that the interrupt packet is routed over the same channel as the data packets. Such an approach may be called for in particular when switching fabric 26 comprises a network in which consistent routing and ordering are not necessarily maintained among successive packets. This approach can also be used when the interrupt path and data path are not the same, and fork at an earlier stage than in FIG. 1. Such path incongruity may occur, for example, when the device writing data to the memory is different from the device asserting the interrupt to the CPU. Sometimes it is also desirable to send interrupts on different (high-priority) routes, because data routes can be congested, causing interrupt messages to get stuck behind data.

Figure 3:
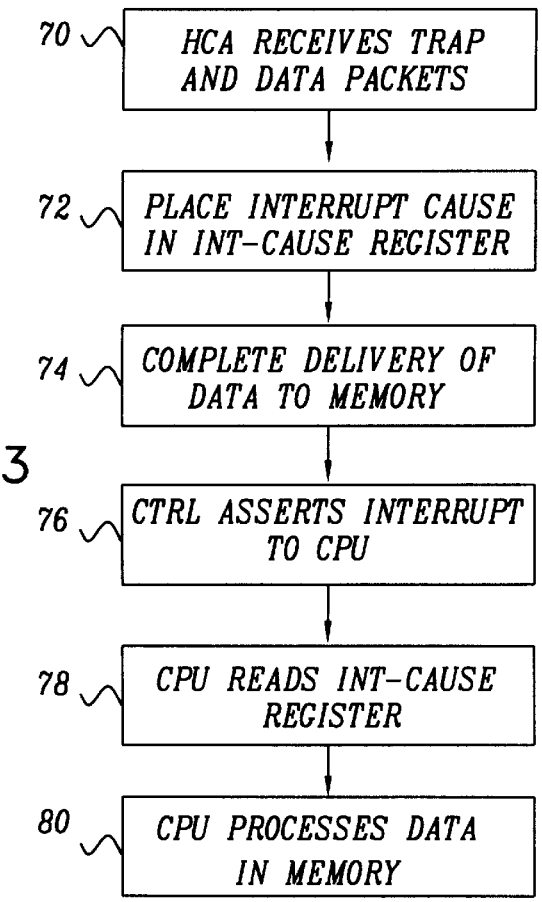
FIG. 3 is a flow chart that schematically illustrates a method for processing data received by the CPU in the system of FIG. 1, in accordance with a preferred embodiment of the present invention.

FIG. 3 is a flow chart that schematically illustrates a method by which data and accompanying interrupt packets are received and processed by host interface unit 28 and CPU 21, in accordance with a preferred embodiment of the present invention. At a packet reception step 70, HCA 32 receives the data and interrupt packets sent from target interface unit 40. The HCA posts the data in the data packets via bus 50 to a buffer 58 of system controller 24. The system controller proceeds to write the data from its buffer to the appropriate addresses in memory 22, as is known in the art. The HCA passes the interrupt packet to controller 36 for decoding, at an interrupt processing step 72. The controller extracts the cause of the interrupt and posts this information, via HCA 32, to an interrupt cause register 56 in memory 22.

Before CPU 21 services the interrupt represented by the interrupt packet, it is necessary to ensure that all of the associated data have been written to memory 22, at a delivery completion step 74. In the case that controller 46 of target interface unit 40 is programmed to send the interrupt packet only after receiving the acknowledgment from memory 22, as described above, this problem is already solved. Otherwise, controller 36 preferably waits to assert the interrupt until system controller 24 has acknowledged to HCA 32 that it has received all of the data. In response to this acknowledgment, controller 36 sends an interrupt signal to interrupt controller 38, at an interrupt assertion step 76. The interrupt controller actuates interrupt input 27 of CPU 21, to inform the CPU that an interrupt has arrived from HCA 32. In response to the interrupt, the CPU preferably sends a dummy read command to the HCA, in order to ensure that buffer 58 is flushed to memory 22 before the CPU itself begins to process the data in the memory.

As a further alternative, as long as it is assured that the interrupt packet reached HCA 32 after the last of the data packets (which will be the case when all of the packets are sent over the same channel, as described above), controller 36 may send the interrupt signal to interrupt controller 38 immediately, without waiting for an acknowledgment from system controller 24. In this case, upon receiving the interrupt, CPU 21 preferably sends a "fence" command to HCA 32. This command instructs the HCA to mark the last packet currently in its receive queue, and to inform the CPU when this last packet has been written to system controller 24. At this point, the CPU can send its dummy read command and begin processing the data in the memory.

Once it is assured that all of the relevant data have reached their destination in memory 22, CPU 21 reads the cause of the current interrupt from register 56, at a cause reading step 78. Based on this information, the CPU processes the data that peripheral device 25 has placed in the memory, at a data processing step 80. Unlike methods of interrupt processing known in the art, all of the steps in the method of FIG. 3 are carried out locally, typically over busses 50 and 52, without the need for messages to traverse fabric 26.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for conveying data over a packet-switching network, comprising:

receiving data from a peripheral device for transmission via the network to a memory associated with a central processing unit (CPU);

receiving an interrupt signal from the peripheral device associated with the data;

sending one or more data packets containing the data over the network to a host network interface serving the memory and the CPU; and sending an interrupt packet over the network to the host network interface, responsive to which an interrupt input of the CPU is asserted only after the one or more data packets have arrived at the host network interface, wherein sending the interrupt packet comprises reading a cause of the interrupt from the peripheral device, and incorporating the cause in the interrupt packet.

2. A method according to claim 1, and comprising receiving the interrupt packet at the host network interface, and writing the cause to a predetermined address in the memory, to be read by the CPU after the interrupt input is asserted.

3. A method for conveying data over a packet-switching network, comprising:

receiving data from a peripheral device for transmission via the network to a memory associated with a central processing unit (CPU);

receiving an interrupt signal from the peripheral device associated with the data;

sending one or more data packets containing the data over the network to a host network interface serving the memory and the CPU; and sending an interrupt packet over the network to the host network interface, responsive to which an interrupt input of the CPU is asserted only after the one or more data packets have arrived at the host network interface, wherein sending the interrupt packet comprises sending the interrupt packet after receiving an acknowledgment from the memory that the data have been written thereto.

4. A method for conveying data over a packet-switching network, comprising:

receiving data from a peripheral device for transmission via the network to a memory associated with a central processing unit (CPU);

receiving an interrupt signal from the peripheral device associated with the data;

sending one or more data packets containing the data over the network to a host network interface serving the memory and the CPU;

sending an interrupt packet over the network to the host network interface, responsive to which an interrupt input of the CPU is asserted only after the one or more data packets have arrived at the host network interface;

receiving the data packets and the interrupt packet at the host network interface;

conveying the data in the packets for delivery to the memory over a local bus coupling the host network interface to the memory and the CPU; and notifying the CPU when all of the data have been conveyed, wherein conveying the data in the packets comprises passing the data to a system controller on the bus, and wherein notifying the CPU comprises informing the CPU when an acknowledgment is received by the host network interface from the system controller.

5. A method according to claim 4, wherein informing the CPU comprises asserting the interrupt input of the CPU after the acknowledgment from the system controller has been received.

6. Network interface apparatus, comprising:

a target channel adapter, which is operative to receive data from a peripheral device for transmission via a packet-switching network to a memory associated with a central processing unit (CPU) and to send one or more data packets containing the data over the network to a host network interface serving the memory and the CPU; and a target interface processor, adapted to receive an interrupt signal from the peripheral device associated with the data, and to send an interrupt packet over the network to the host network interface, responsive to which an interrupt input of the CPU is asserted only after the one or more data packets have arrived at the host network interface, wherein the target channel adapter is operative to read a cause of the interrupt from the peripheral device, and wherein the processor is adapted to incorporate the cause in the interrupt packet.

7. Apparatus according to claim 6, and comprising a host channel adapter, coupled to receive the interrupt packet at the host network interface, and to write the cause to a predetermined address in the memory, to be read by the CPU after the interrupt input is asserted.

8. Network interface apparatus, comprising:

a target channel adapter, which is operative to receive data from a peripheral device for transmission via a packet-switching network to a memory associated with a central Processing unit (CPU) and to send one or more data packets containing the data over the network to a host network interface serving the memory and the CPU; and a target interface processor, adapted to receive an interrupt signal from the peripheral device associated with the data, and to send an interrupt packet over the network to the host network interface, responsive to which an interrupt input of the CPU is asserted only after the one or more data packets have arrived at the host network interface, wherein the processor is adapted to send the interrupt packet after receiving an acknowledgment from the memory that the data have been written thereto.

9. Network interface apparatus, comprising:

a target channel adapter, which is operative to receive data from a peripheral device for transmission via a packet-switching network to a memory associated with a central Processing unit (CPU) and to send one or more data packets containing the data over the network to a host network interface serving the memory and the CPU; and a target interface processor, adapted to receive an interrupt signal from the peripheral device associated with the data, and to send an interrupt packet over the network to the host network interface, responsive to which an interrupt input of the CPU is asserted only after the one or more data packets have arrived at the host network interface, wherein the target channel adapter is coupled to send the data packets over a selected channel through the network, and wherein the processor is adapted to send the interrupt packet over the selected channel following the data packets, and comprising a switch coupling the target channel adapter and the processor to the network, wherein the switch comprises a receive queue into which the target channel adapter places the data packets, and wherein the processor is adapted to place the interrupt packet into the receive queue following the data packets.

10. Apparatus according to claim 9, and comprising a host interface unit, which is coupled to receive the data and interrupt packets transmitted over the network, and is operative to convey the data in the packets for delivery to the memory over a local bus coupled to the memory and the CPU and to notify the CPU when all of the data have been conveyed.

11. Apparatus according to claim 10, wherein the host interface unit is coupled to assert the interrupt to the CPU responsive to the interrupt packet.

12. Network interface apparatus, comprising:

a host channel adapter, which is operative to receive data packets transmitted over a packet-switching network from a peripheral device, and to convey data from the packets for delivery to a memory associated with a CPU over a local bus that is coupled to the memory and the CPU, and further to receive an interrupt packet sent over the network responsive to an interrupt signal asserted by the peripheral device after sending the data to the network; and a host interface processor, adapted, responsive to the interrupt packet, to notify the CPU when all of the data have been conveyed to the local bus, wherein the host channel adapter is operative to convey the data to a system controller on the bus, and wherein the CPU is notified when an acknowledgment is received by the host channel adapter from the system controller.

13. Apparatus according to claim 12, wherein the host interface processor is coupled to assert the interrupt input of the CPU after the acknowledgment from the system controller has been received.

14. Network interface apparatus, comprising:

a host channel adapter, which is operative to receive data packets transmitted over a packet-switching network from a peripheral device, and to convey data from the packets for delivery to a memory associated with a CPU over a local bus that is coupled to the memory and the CPU, and further to receive an interrupt packet sent over the network responsive to an interrupt signal asserted by the peripheral device after sending the data to the network, the interrupt packet incorporating a cause of the interrupt read from the peripheral device; and a host interface processor, adapted, responsive to the interrupt packet, to assert an interrupt input to the CPU when all of the data have been conveyed to the local bus, and to write the cause to a predetermined address in the memory, to be read by the CPU after the interrupt input is asserted.

* * * * *

UNITED STATES PATENT AND TRADEMARK OFFICE
CERTIFICATE OF CORRECTION

PATENT NO. : 6,243,787 B1  
DATED : June 5, 2001  
INVENTOR(S) : Kagan et al.

Page 1 of 1

It is certified that error appears in the above-identified patent and that said Letters Patent is hereby corrected as shown below:

<u>Title page,</u>
Item [54], please delete "POCKETS" and substitute -- PACKETS, --

Signed and Sealed this

Thirtieth Day of April, 2002

*Attest:*

*Attesting Officer*

JAMES E. ROGAN
*Director of the United States Patent and Trademark Office*